US011493170B2

(12) United States Patent
Yang et al.

(10) Patent No.: US 11,493,170 B2
(45) Date of Patent: Nov. 8, 2022

(54) DIE LUBRICANT ROTATING SPRAY TRAY DEVICE

(71) Applicant: CITIC Dicastal Co., Ltd., Qinhuangdao (CN)

(72) Inventors: Jinling Yang, Qinhuangdao (CN); Xiaoting Zhu, Qinhuangdao (CN); Jiansheng Wang, Qinhuangdao (CN); Weizhou Liu, Qinhuangdao (CN); Hongshen Zhang, Qinhuangdao (CN); Li Yang, Qinhuangdao (CN)

(73) Assignee: CITIC DICASTAL CO., LTD., Qinhuangdao (CN)

(*) Notice: Subject to any disclaimer, the term of this patent is extended or adjusted under 35 U.S.C. 154(b) by 672 days.

(21) Appl. No.: 16/561,368

(22) Filed: Sep. 5, 2019

(65) Prior Publication Data

US 2020/0300410 A1 Sep. 24, 2020

(30) Foreign Application Priority Data

Mar. 21, 2019 (CN) .......................... 201910216433.3

(51) Int. Cl.
| F16N 25/04 | (2006.01) |
| B21J 3/00 | (2006.01) |
| B30B 15/00 | (2006.01) |
| F16N 7/32 | (2006.01) |
| B21J 5/02 | (2006.01) |
| F16N 7/26 | (2006.01) |
| F16N 21/04 | (2006.01) |

(52) U.S. Cl.
CPC ................ *F16N 25/04* (2013.01); *B21J 3/00* (2013.01); *B30B 15/0088* (2013.01); *F16N 7/26* (2013.01); *F16N 7/32* (2013.01); *B21J 5/025* (2013.01); *F16N 21/04* (2013.01)

(58) Field of Classification Search
CPC .............................. B30B 15/0088; B21J 3/00
See application file for complete search history.

(56) References Cited

U.S. PATENT DOCUMENTS

| 5,065,945 | A | * | 11/1991 | Vidusek | .................... | B05B 7/08 |
| | | | | | | 239/556 |
| 6,192,968 | B1 | * | 2/2001 | Renkl | .................... | B05B 3/1057 |
| | | | | | | 164/121 |
| 2017/0304850 | A1 | * | 10/2017 | Markus | ................. | B05B 7/0483 |
| 2018/0200740 | A1 | * | 7/2018 | Rossbach | ............ | B30B 15/0088 |
| 2019/0193309 | A1 | * | 6/2019 | Kitamura | ............ | B30B 15/0088 |

* cited by examiner

*Primary Examiner* — Shelley M Self
*Assistant Examiner* — Katie L. Parr
(74) *Attorney, Agent, or Firm* — IPro, PLLC

(57) ABSTRACT

Provided a die lubricant rotating spray tray device, wherein the nozzles, the connecting sleeve bodies, the nozzle connecting pipes, the air pipe joints and the lubricant pipe joints are sequentially connected to form independently-communicated cavity pipelines, compressed air is input from the air pipe joints, a lubricant is input from the lubricant pipe joints, the rotation driving mechanisms drive the spray tray rotators to rotate through the transmission mechanisms, and the spray tray rotators drive the nozzles to rotate, so that the same dosage of the lubricant is sprayed on the maximum pitch circle surfaces of upper and lower dies, the aim of uniformly spraying the forging lubricant on the working surfaces of the upper and lower dies is achieved.

10 Claims, 2 Drawing Sheets

DIE LUBRICANT ROTATING SPRAY TRAY DEVICE

FIELD

The present disclosure belongs to the technical field of forging equipment and specifically relates to a die lubricant rotating spray tray device.

BACKGROUND

A wheel hub forging die used in each process is divided into an upper die and a lower die, a lubricant is required to be sprayed on working surfaces of the upper and lower dies during use, and thus, a good product may be forged. Therefore, no matter manual production or automatic production is adopted, each manufacturer manually or fixedly sprays a lubricant on the working surfaces of the dies, which results in time and labor consumption, low efficiency and low automation degree. Sometimes, the lubricant cannot be sprayed or uniformly sprayed on some places on the working surfaces of the dies, which results in forging production defects, and these defects become a bottleneck of increasing the efficiency in production and also become factors affecting the production efficiency. In order to solve the problems that the lubricant cannot reach every place on the working surface of the die and is sprayed non-uniformly, to meet efficient production requirements and to improve the labor productivity, a die lubricant rotating spray tray device is specially designed to increase the production efficiency of a product and remove the forging production defects.

SUMMARY

The embodiment of the present disclosure provides a die lubricant rotating spray tray device by which the aim of uniformly spraying a forging lubricant on the working surfaces of upper and lower dies may be achieved, the same dosage of the lubricant may be controlled to be sprayed on the maximum pitch circle surfaces of the upper and lower dies, the effect of uniform forging lubrication is realized, and forging defects are reduced; and meanwhile, the automatic spraying of the lubricant on the maximum pitch circle surfaces of the upper and lower dies may be realized, the automation degree of equipment may be increased, the requirement for efficient production may be met, and the work efficiency may be increased.

In order to achieve the aim, the present disclosure proposes the following technical solution:

a die lubricant rotating spray tray device, comprising an upper spray tray rotator, a lower spray tray rotator, an upper nozzle, a lower nozzle, a spray tray main frame, an upper transmission mechanism, a lower transmission mechanism, an upper rotation driving mechanism, a lower rotation driving mechanism, upper connecting sleeve bodies, lower connecting sleeve bodies, upper nozzle connecting pipes, upper air pipe joints, upper lubricant pipe joints, lower nozzle connecting pipes, lower air pipe joints and lower lubricant pipe joints, wherein the spray tray main frame is divided into an upper part and a lower part which are symmetrical, the upper part of the spray tray main frame is provided with the upper spray tray rotator, the upper nozzle, the upper transmission mechanism, the upper rotation driving mechanism, the upper connecting sleeve bodies, the upper nozzle connecting pipes, the upper air pipe joints and the upper lubricant pipe joints; the upper nozzle is a circular empty tube with a top surface and forms a cavity, through holes in communication with the outside are formed in the corresponding top surface of the cavity, or the upper nozzle is a plurality of mutually-nested circular empty tubes with a top surface and forms a plurality of cavities, and through holes in communication with the outside are formed in the corresponding top surface of each cavity; the upper spray tray rotator is a circular empty tube, the outer side of the upper nozzle is fixedly connected with the inner wall of the upper spray tray rotator, and the upper nozzle is capable of rotating with the upper spray tray rotator; the lower end of the upper nozzle is connected with one or more upper connecting sleeve bodies fixedly arranged at the upper part of the spray tray main frame, one end of each upper connecting sleeve body is connected with the lower end of the upper nozzle, and the other end of the upper connecting sleeve body is connected with the upper nozzle connecting pipe; one end of each upper nozzle connecting pipe is connected with the upper connecting sleeve body, the other end of the upper nozzle connecting pipe is connected with the upper air pipe joint and the upper lubricant pipe joint, compressed air is input from the upper air pipe joints, and a lubricant is input from the upper lubricant pipe joints; one cavity of the upper nozzle is correspondingly connected with one upper connecting sleeve body, one upper connecting sleeve body is correspondingly connected with one upper nozzle connecting pipe, one upper nozzle connecting pipe is correspondingly connected with one upper air pipe joint and one upper lubricant pipe joint to form an independently-communicated cavity pipeline; the upper transmission mechanism is connected with a rotating shaft of the upper rotation driving mechanism and the upper spray tray rotator, the upper rotation driving mechanism drives the upper spray tray rotator to rotate by virtue of the upper transmission mechanism, and the upper spray tray rotator and the upper nozzle rotate relative to the upper connecting sleeve bodies; and the lower part of the spray tray main frame is provided with the lower spray tray rotator, the lower nozzle, the lower transmission mechanism, the lower rotation driving mechanism, the lower connecting sleeve bodies, the lower nozzle connecting pipes, the lower air pipe joints and the lower lubricant pipe joints; the lower nozzle is a circular empty tube with a bottom surface to form a cavity, through holes in communication with the outside are formed in the corresponding bottom surface of the cavity, or the lower nozzle is a plurality of mutually-nested circular empty tubes with a bottom surface and forms a plurality of cavities, and through holes in communication with the outside are formed in the corresponding bottom surface of each cavity; the lower spray tray rotator is a circular empty tube, the outer side of the lower nozzle is fixedly connected with the inner wall of the lower spray tray rotator, and the lower nozzle is capable of rotating with the lower spray tray rotator; the upper end of the lower nozzle is connected with one or more upper connecting sleeve bodies fixedly arranged at the lower part of the spray tray main frame, one end of each lower connecting sleeve body is connected with the upper end of the lower nozzle, and the other end of the lower connecting sleeve body is connected with the lower nozzle connecting pipe; one end of each lower nozzle connecting pipe is connected with the lower connecting sleeve body, the other end of the lower nozzle connecting pipe is connected with the lower air pipe joint and the lower lubricant pipe joint, compressed air is input from the lower air pipe joints, and a lubricant is input from the lower lubricant pipe joints; one cavity of the lower nozzle is correspondingly connected with one lower connecting sleeve body, one lower connecting sleeve body is correspondingly connected with one lower nozzle connecting pipe, one lower nozzle connecting pipe is correspondingly connected with one lower air pipe joint and one lower lubricant pipe joint to form an independently-communicated cavity pipeline; the lower transmission mechanism is connected with a rotating shaft of the lower rotation driving mechanism and the lower spray tray rotator, the lower rotation driving mechanism drives the lower spray tray rotator to rotate by virtue of the lower transmission mechanism, and the lower spray tray rotator and the lower nozzle rotate relative to the lower connecting sleeve bodies.

In some embodiments, wherein each of the upper rotation driving mechanism and the lower rotation driving mechanism comprises a servo motor, a protruded flange, a coupling, a rotating shaft, a small flange and rotating bearings, the servo motor is arranged on the protruded flange and is fixedly arranged in the spray tray main frame by the protruded flange, an output shaft of the servo motor is connected with the coupling after penetrating through the protruded flange, and the coupling is connected with the output shaft of the servo motor and the rotating shaft; one end of the rotating shaft is connected with the coupling, and the other end of the rotating shaft is fixedly arranged on the surface of the spray tray main frame by the small flange; and the upper and lower ends of the rotating shaft are sleeved with the rotating bearings fixedly arranged in the spray tray main frame.

In some embodiments, wherein each of the upper transmission mechanism and the lower transmission mechanism comprises a pinion and a large gear, the large gears are fixedly arranged at the outer sides of the upper spray tray rotator and the lower spray tray rotator, and the pinions are fixedly arranged on the rotating shafts of the upper rotation driving mechanism and the lower rotation driving mechanism; and the pinions and the large gears are occluded to rotate.

In some embodiments, wherein the inside of the lower end of the circular empty tube of the upper nozzle is provided with a circular ring which is inwards protruded; the outer side of the upper end of the upper connecting sleeve body is provided with a circular ring which is outwards protruded; the circular ring of the circular empty tube of the upper nozzle is connected with the circular ring of the upper connecting sleeve body and is capable of rotating on the circular ring of the upper connecting sleeve body; the inside of the upper end of the circular empty tube of the lower nozzle is provided with a circular ring which is inwards protruded; the outer side of the lower end of the lower connecting sleeve body is provided with a circular ring which is outwards protruded; and the circular ring of the circular empty tube of the lower nozzle is connected with the circular ring of the lower connecting sleeve body and is capable of rotating on the circular ring of the lower connecting sleeve body.

In some embodiments, wherein a sealing ring is arranged between the circular ring of the circular empty tube of the upper nozzle and the circular ring of the upper connecting sleeve body; and a sealing ring is arranged between the circular ring of the circular empty tube of the lower nozzle and the circular ring of the lower connecting sleeve body.

In some embodiments, wherein each of the upper end of the upper spray tray rotator and the lower end of the lower spray tray rotator is provided with a flange fixedly arranged on the spray tray main frame; the upper end of the lower spray tray rotator is further provided with two semicircular flanges which are fixedly connected to the spray tray main frame.

In some embodiments, wherein the outer side of each of the upper and lower ends of the upper spray tray rotator and the lower spray tray rotator is provided with a bearing fixedly arranged on the spray tray main frame.

In some embodiments, wherein baffle rings are arranged between the upper transmission mechanism at the outer side of the upper spray tray rotator and the bearings at the outer sides of the upper and lower ends of the upper spray tray rotator and sleeve the outer side of the upper spray tray rotator; and baffle rings are further arranged between the lower transmission mechanism at the outer side of the lower spray tray rotator and the bearings at the outer sides of the upper and lower ends of the lower spray tray rotator and sleeve the outer side of the lower spray tray rotator.

In some embodiments, wherein each of the top surface of the upper nozzle and the bottom surface of the lower nozzle is provided with a nozzle end cover, holes corresponding to the through holes in the upper nozzle or the lower nozzle are formed in each nozzle end cover, and the holes in the nozzle end covers are horn-shaped.

In some embodiments, wherein the upper air pipe joints and the lower air pipe joints are connected to a compressed air valve body control pipeline, and the upper lubricant pipe joints and the lower lubricant pipe joints are connected to a lubricant valve body control pipeline; the device is further provided with a control unit which is respectively connected with a pipeline valve body of the compressed air valve body control pipeline and a pipeline valve body of the lubricant valve body control pipeline and the servo motors in the upper rotation driving mechanism and the lower rotation driving mechanism in a signal manner; and the control unit realizes control on the flow rates, flow velocities and pressures of the compressed air and the lubricant by controlling the pipeline valve bodies and realizes control on the rotating speed and the rotating time by controlling the servo motors, so that the amount of the lubricant sprayed towards the surfaces of the dies is controlled. In this way, the aim of automatically controlling the dosage of the lubricant on the working surfaces may be realized by controlling the servo motors and the pipeline valve bodies, the automation degree of the equipment may be improved, the requirement for efficient production may be met, and the work efficiency may be increased.

Compared with the prior art, the present disclosure has the beneficial effects:

the present disclosure provides a die lubricant rotating spray tray device, nozzles, connecting sleeve bodies, nozzle connecting pipes, air pipe joints and lubricant pipe joints are sequentially connected to form independently-communicated cavity pipelines, compressed air is input from the air pipe joints, the lubricant is input from the lubricant pipe joints, the rotation driving mechanisms drive the spray tray rotators to rotate through the transmission mechanisms, and the spray tray rotators drive the nozzles to rotate, so that the same dosage of the lubricant is sprayed on the maximum pitch circle surfaces of upper and lower dies, the aim of uniformly spraying the forging lubricant on the working surfaces of the upper and lower dies is achieved, and forging defects are reduced; and meanwhile, the automatic spraying of the lubricant on the maximum pitch circle surfaces of the upper and lower dies may be realized, the automation degree of equipment may be increased, and the production efficiency may be increased.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

wherein: 1—flange, 2—upper nozzle, 3—lower nozzle, 4—lower spray tray rotator, 5—upper spray tray rotator, 6—bearing, 7—baffle ring, 8—large gear, 9—rotating bearing, 10—small flange, 11—sealing ring, 12—pinion, 13—rotating shaft, 14—coupling, 15—protruded flange, 16—upper connecting sleeve body, 17—servo motor, 18—spray tray main frame, 19—upper nozzle connecting pipe, 20—upper air pipe joint, 21—upper lubricant pipe joint, 22—lower nozzle connecting pipe, 23—lower air pipe joint, 24—lower lubricant pipe joint, 25—lower connecting sleeve body, 26—semicircular flange and 27—nozzle end cover.

DETAILED DESCRIPTION OF THE EMBODIMENTS

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

Figure 1:
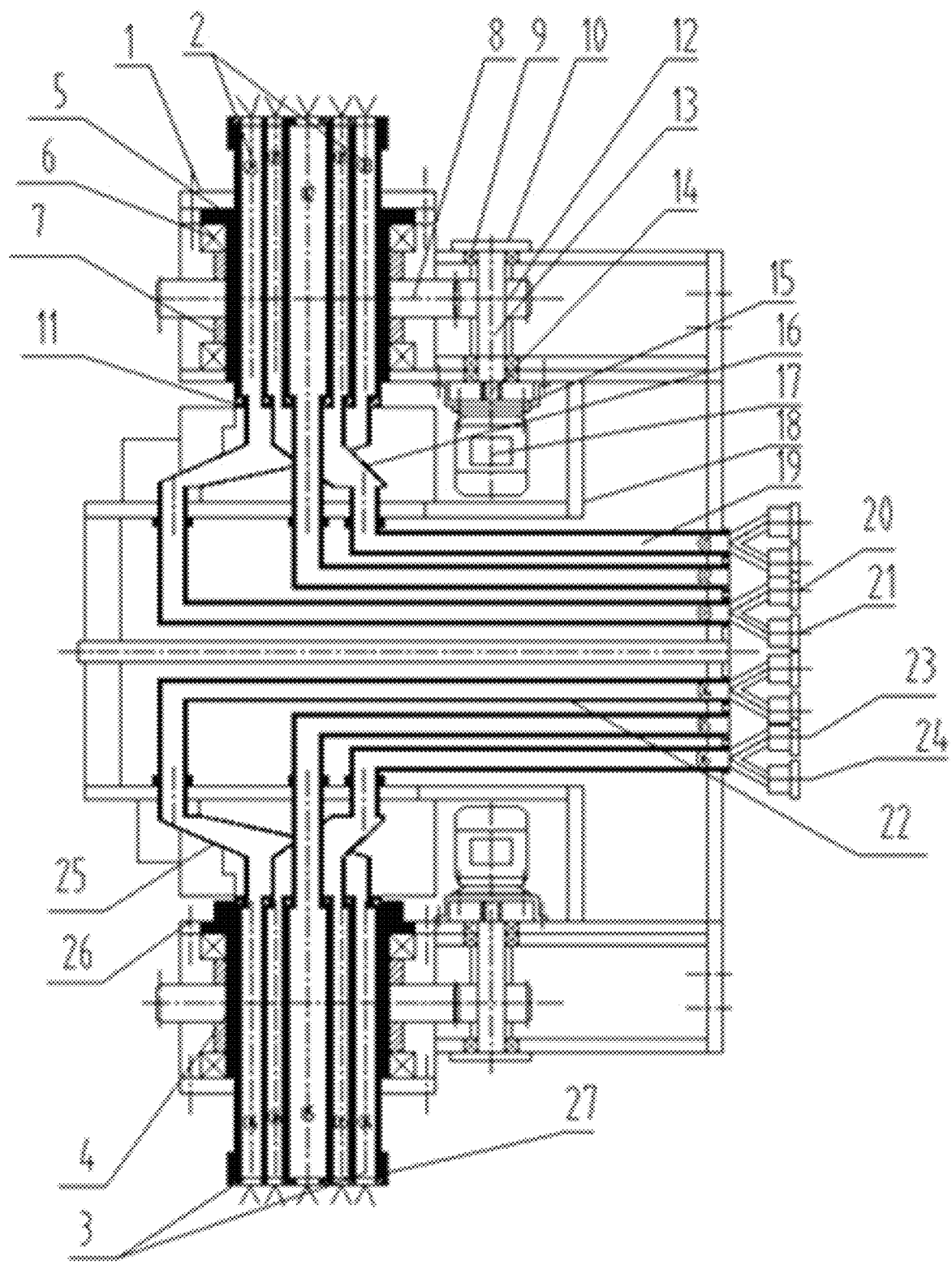
FIG. 1 is a structural schematic diagram of a die lubricant rotating spray tray device provided by the present disclosure.
Figure 2:
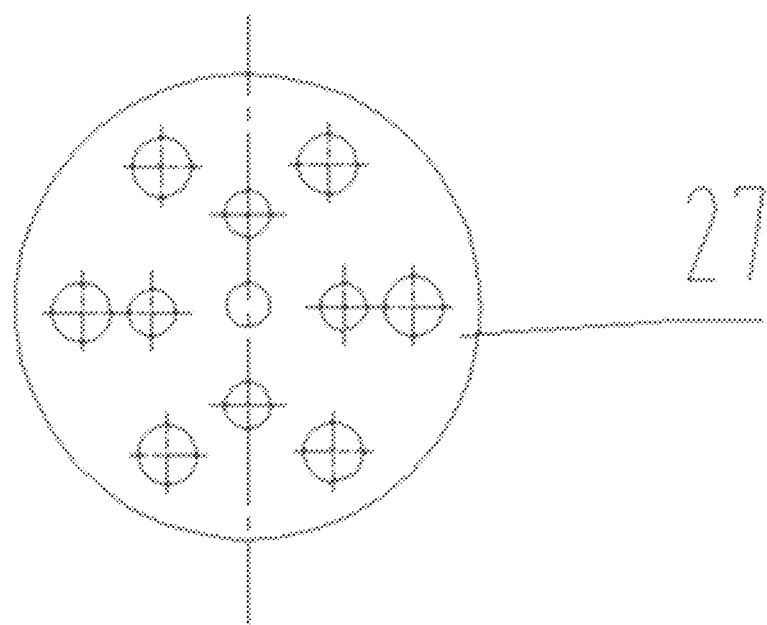
FIG. 2 is a schematic diagram of a nozzle end cover of the die lubricant rotating spray tray device provided by the present disclosure.

The embodiment 1 of the present disclosure is described below in combination with an accompanying drawing 1:

a die lubricant rotating spray tray device comprises flanges 1, an upper nozzle 2, a lower nozzle 3, a lower nozzle rotator 4, an upper spray tray rotator 5, bearings 6, baffle rings 7, sealing rings 11, a spray tray main frame 18, an upper transmission mechanism, a lower transmission mechanism, an upper rotation driving mechanism, a lower rotation driving mechanism, upper connecting sleeve bodies 16, upper nozzle connecting pipes 19, upper air pipe joints 20, upper lubricant pipe joints 21, lower nozzle connecting pipes 22, lower air pipe joints 23, lower lubricant pipe joints 24, lower connecting sleeve bodies 25, semicircular flanges 26 and nozzle end covers 27. As shown in FIG. 1, the spray tray main frame 18 is divided into an upper part and a lower part which are symmetrical, and the upper part of the spray tray main frame 18 is provided with the upper spray tray rotator 5, the upper nozzle 2, the upper transmission mechanism, the upper rotation driving mechanism, three upper connecting sleeve bodies 16, three upper nozzle connecting pipes 19, three upper air pipe joints 20, three upper lubricant pipe joints 21, one flange 1, two bearings 6, two baffle rings 7 and three sealing rings 11. The upper nozzle 2 is a plurality of mutually-nested circular empty tubes with a top surface and forms a plurality of cavities, and through holes in communication with the outside are formed in the corresponding top surface of each cavity, and as shown in FIG. 1, the upper nozzle 2 is three mutually-nested circular empty tubes with a top surface and forms three cavities which are of an integrated structure and are respectively pitch circle closed mold cavities 01, 02 and 03; the upper spray tray rotator 5 is a circular empty tube, the upper end of the upper spray tray rotator 5 is provided with a circular ring which is outwards protruded and is snapped on the bearing 6 at the upper part, the upper end of the upper spray tray rotator 5 is provided with one flange 1, and the flange 1 is arranged on the upper spray tray rotator 5, is connected with and fixedly arranged on the spray tray main frame 18 by using a bolt and is used for fixing the upper spray tray rotator 5 to the upper surface of the spray tray main frame 18; the outer side of each of the upper and lower ends of the upper spray tray rotator 5 is provided with the bearing 6 fixedly arranged in the spray tray main frame 18. The outer side of the upper nozzle 2 and the inner wall of the upper spray tray rotator 5 are welded into a whole so as to be fixedly connected, and the upper nozzle 2 is capable of rotating with the upper spray tray rotator 5; the lower end of the upper nozzle 2 is connected with the three upper connecting sleeve bodies 16 fixedly arranged at the upper part of the spray tray main frame 18, one end of each upper connecting sleeve body 16 is connected with the lower end of the upper nozzle 2, and the other ends of the upper connecting sleeve bodies 16 are connected with the upper nozzle connecting pipes 19; one end of each upper nozzle connecting pipe 19 is connected with the upper connecting sleeve body 16, the other ends of the upper nozzle connecting pipe 19 is connected with the upper air pipe joint 20 and the upper lubricant pipe joint 21, compressed air is input from the upper air pipe joints 20, and a lubricant is input from the upper lubricant pipe joints 21; one cavity of the upper nozzle 2 is correspondingly connected with one upper connecting sleeve body 16, one upper connecting sleeve body 16 is correspondingly connected with one upper nozzle connecting pipe 19, one upper nozzle connecting pipe 19 is correspondingly connected with one upper air pipe joint 20 and one upper lubricant pipe joint 21 to form an independently-communicated cavity pipeline. The inside of the lower end of the circular empty tube of the upper nozzle 2 is provided with a circular ring which is inwards protruded, the outer side of the upper end of the upper connecting sleeve body 16 is provided with a circular ring which is outwards protruded, and the circular ring of the circular empty tube of the upper nozzle 2 is connected with the circular ring of the upper connecting sleeve body 16 and is capable of rotating on the circular ring of the upper connecting sleeve body 16. The sealing ring 11 is arranged between the circular ring of the circular empty tube of the upper nozzle 2 and the circular ring of the upper connecting sleeve body 16, and the sealing rings 11 play a sealing role when the upper spray tray rotator 2 and the upper nozzle 2 rotate relative to the upper connecting sleeve bodies 16. One nozzle end cover 27 is fixedly arranged on the top surface of the upper nozzle, holes corresponding to the through holes in the upper nozzle are formed in the nozzle end cover 27, and the holes in the nozzle end cover 27 are horn-shaped and play a uniform spraying role.

The upper rotation driving mechanism comprises a servo motor 17, a protruded flange 15, a coupling 14, a rotating shaft 13, a small flange 10 and rotating bearings 9, the servo motor 17 is arranged on the protruded flange 15 and is fixedly arranged in the spray tray main frame 18 by the protruded flange 15, an output shaft of the servo motor 17 is connected with the coupling 14 after penetrating through the protruded flange 15, and the coupling 14 is connected with the output shaft of the servo motor 17 and the rotating shaft 13; one end of the rotating shaft 13 is connected with the coupling 14, and the other end of the rotating shaft 13 is fixedly arranged on the upper surface of the spray tray main frame 18 by the small flange 10; and the upper and lower ends of the rotating shaft 13 are sleeved with the rotating bearings 9 fixedly arranged in the upper part of the spray tray main frame 18. The upper transmission mechanism comprises a pinion 12 and a large gear 8, the large gear 8 is fixedly arranged at the outer side of the upper spray tray rotator 5, the pinion 12 is fixedly arranged on the rotating shaft 13 of the upper rotation driving mechanism by a connecting key, and the pinion 12 and the large gear 8 are occluded to rotate. In addition, baffle rings 7 are arranged between the large gear 8 at the outer side of the upper stray tray rotator 5 and the bearings 6 at the outer sides of the upper and lower ends of the upper spray tray rotator 5 and sleeve the outer side of the upper spray tray rotator 5. The output shaft of the servo motor 17 fixedly arranged at the upper part of the spray tray main frame 18 drives the rotating shaft 13 to rotate through the coupling 14, the pinion 12 on the rotating shaft 13 rotates with the rotating shaft 13 and drives the large gear 8 to rotate, the large gear 8 drives the upper spray tray rotator 5 to rotate, and the upper nozzle 2 rotates with the upper spray tray rotator 5 to spray the lubricant on the surface of the upper die.

The lower part of the spray tray main frame 18 is provided with the lower spray tray rotator 4, the upper nozzle 3, the lower transmission mechanism, the lower rotation driving mechanism, three lower connecting sleeve bodies 25, three lower nozzle connecting pipes 22, three lower air pipe joints 23, three lower lubricant pipe joints 24, one flange 1, two bearings 6, two baffle rings 7, three sealing rings 11 and two semicircular flanges 26. The lower nozzle 3 is a plurality of mutually-nested circular empty tubes with a bottom surface and forms a plurality of cavities, and through holes in communication with the outside are formed in the corresponding bottom surface of each cavity, and as shown in FIG. 1, the lower nozzle 3 is three mutually-nested circular empty tubes with a top surface and forms three cavities which are of an integrated structure and are respectively pitch circle closed mold cavities 04, 05 and 06; the lower spray tray rotator 4 is a circular empty tube, the upper end of the lower spray tray rotator 4 is provided with circular ring which is outwards protruded and is snapped on the bearing 6 at the lower part, the lower end of the lower spray tray rotator 4 is provided with one flange 1, and the flange 1 is arranged on the lower spray tray rotator 4, is connected with and fixedly arranged on the bottom surface of the spray tray main frame 18 by using a bolt and is used for fixing the lower spray tray rotator 4 to the bottom surface of the spray tray main frame 18. The upper end of the lower spray tray rotator 4 is further provided with two semicircular flanges 26 fixedly connected to the spray tray main frame 18 and used for fixing the upper end of the lower spray tray rotator 4. The outer side of each of the upper and lower ends of the lower spray tray rotator 4 is provided with the bearing 6 fixedly arranged in the spray tray main frame 18. The outer side of the lower nozzle 3 and the inner wall of the lower spray tray rotator 4 are welded into a whole so as to be fixedly connected, and the lower nozzle 3 is capable of rotating with the lower spray tray rotator 4; the upper end of the lower nozzle 3 is connected with the three lower connecting sleeve bodies 25 fixedly arranged at the lower part of the spray tray main frame 18, one end of each lower connecting sleeve body 25 is connected with the upper end of the lower nozzle 3, and the other end of the lower connecting sleeve body 25 is connected with the lower nozzle connecting pipe 22; one end of each lower nozzle connecting pipe 22 is connected with the lower connecting sleeve body 25, the other end of the lower nozzle connecting pipe 22 is connected with the lower air pipe joint 23 and the lower lubricant pipe joint 23, compressed air is input from the lower air pipe joints 23, and a lubricant is input from the lower lubricant pipe joints 24; one cavity of the lower nozzle 3 is of an integrated structure and is correspondingly connected with one lower connecting sleeve body 25, one lower connecting sleeve body 25 is correspondingly connected with one lower nozzle connecting pipe 22, one lower nozzle connecting pipe 22 is correspondingly connected with one lower air pipe joint 23 and one lower lubricant pipe joint 24 to form an independently-communicated cavity pipeline. The inside of the upper end of the circular empty tube of the lower nozzle 3 is provided with circular ring which is inwards protruded; the outer side of the lower end of the lower connecting sleeve body 25 is provided with a circular ring which is outwards protruded; and the circular ring of the circular empty tube of the lower nozzle 3 are connected with the circular ring of the lower connecting sleeve body 25 and is capable of rotating on the circular ring of the lower connecting sleeve body 25. The sealing ring 11 is arranged between the circular ring of the circular empty tube of the lower nozzle 3 and the circular ring of the lower connecting sleeve body 25, and the sealing rings 11 play a sealing role when the lower spray tray rotator 4 and the lower nozzle 3 rotate relative to the lower connecting sleeve bodies 25. One nozzle end cover 27 is fixedly arranged on the bottom surface of the lower nozzle 3, holes corresponding to the through holes in the lower nozzle 3 are formed in the nozzle end cover 27, and the holes in the nozzle end cover 27 are horn-shaped and play a uniform spraying role.

The lower rotation driving mechanism comprises a servo motor 17, a protruded flange 15, a coupling 14, a rotating shaft 13, a small flange 10 and rotating bearings 9, the servo motor 17 is arranged on the protruded flange 15 and is fixedly arranged in the lower part of the spray tray main frame 18 by the protruded flange 15, an output shaft of the servo motor 17 is connected with the coupling 14 after penetrating through the protruded flange 15, and the coupling 14 is connected with the output shaft of the servo motor 17 and the rotating shaft 13; one end of the rotating shaft 13 is connected with the coupling 14, and the other end of the rotating shaft 13 is fixedly arranged on the bottom surface of the spray tray main frame 18 by the small flange 10; and the upper and lower ends of the rotating shaft 13 are sleeved with the rotating bearings 9 fixedly arranged in the lower part of the spray tray main frame 18. The lower transmission mechanism comprises a pinion 12 and a large gear 8, the large gear 8 is fixedly arranged at the outer side of the lower spray tray rotator 4, the pinion 12 is fixedly arranged on the rotating shaft 13 of the lower rotation driving mechanism by a connecting key, and the pinion 12 and the large gear 8 are occluded to rotate. Baffle rings are arranged between the large gear 8 at the outer side of the lower stray tray rotator 4 and the bearings 6 at the outer sides of the upper and lower ends of the lower spray tray rotator 4 and sleeve the outer side of the lower spray tray rotator 4. The output shaft of the servo motor 17 fixedly arranged at the lower part of the spray tray main frame 18 drives the rotating shaft 13 to rotate through the coupling 14, the pinion 12 on the rotating shaft 13 rotates with the rotating shaft 13 and drives the large gear 8 to rotate, the large gear 8 drives the lower spray tray rotator 4 to rotate, and the lower nozzle 3 rotates with the lower spray tray rotator 3 to spray the lubricant on the surface of the lower die.

In an actual using process: firstly, the spray tray main frame 18 is connected to a telescopic control arm at the periphery of the equipment so that the device provided by the present disclosure is telescopic on middle positions of the dies. Then, one upper air pipe joint 20 and one upper lubricant pipe joint 21 form one group, the upper air pipe joint 20 and the upper lubricant pipe joint 21 in every group are connected to a compressed air pipe and a lubricant pressure tank in a workshop, three groups of the upper air pipe joints 20 and the upper lubricant pipe joints 21 are respectively connected to the insides of the corresponding pitch circle closed mold cavities 01, 02 and 03 in the upper nozzle by the respectively corresponding upper nozzle connecting pipes 19 and upper connecting sleeve bodies 16, and the compressed air and the lubricant are respectively sprayed into the pipe cavities 01, 02 and 03 at the upper part and are sprayed towards the upper die by the upper nozzle. One lower air pipe joint 23 and one lower lubricant pipe joint 24 form one group, three groups of lower air pipe joints 23 and lower lubricant pipe joints 24 are respectively connected to the insides of the corresponding pipe cavities 04, 05 and 06 in the lower nozzle 3 by the respectively corresponding lower nozzle connecting pipes 22 and lower connecting sleeve bodies 25, and the compressed air and the lubricant are respectively sprayed into the pitch circle closed mold cavities 04, 05 and 06 at the lower part and are sprayed towards the lower die by the lower nozzle 3. Main shafts of the servo motors 17 drive the rotating shafts 13 to rotate, the rotating shafts 13 rotate to drive the pinions 12 to simultaneously rotate, the pinions 12 and the large gears 8 are occluded to rotate, the two large gears 8 drive the lower spray tray rotator 4 and the upper spray tray rotator 5 to simultaneously rotate, the upper spray tray rotator 5 drives the upper nozzle 2 to simultaneously rotate, and the lower spray tray rotator 4 drives the lower nozzle 3 to simultaneously rotate. A mixture of the compressed air and the lubricant is sprayed into the pitch circle closed mold cavities of the pipe cavities 01, 02 and 03 and is sprayed towards the upper die by the upper nozzle 2. The mixture of the compressed air and the lubricant is sprayed into the pitch circle closed mold cavities of the pipe cavities 04, 05 and 06 and is sprayed towards the lower die by the lower nozzle 3. The same dosage of the lubricant is respectively sprayed on the maximum pitch circle surfaces of the upper and lower dies, and the aim of uniformly spraying the forging lubricant on the working surfaces of the upper and lower dies is achieved.

In addition, the air pipe joints and the lubricant pipe joints are connected to the compressed air valve body control pipeline and the lubricant valve body control pipeline. The flow rates, flow velocities and pressures of the compressed air and the lubricant serving as two media flowing into the pipe cavities 01, 02 and 03 at the upper part and the pipe cavities 04, 05 and 06 are controlled by controlling the pipeline valve bodies, so that the dosage of the mixture of the compressed air and the lubricant sprayed into the closed pipe cavities 01, 02 and 03 and sprayed towards the working surface of the upper die by the upper nozzle is controlled or regulated, meanwhile, the dosage of the mixture of the compressed air and the lubricant sprayed into the closed pipe cavities 04, 05 and 06 and sprayed towards the working surface of the lower die by the lower nozzle is controlled or regulated, the dosage of the lubricant sprayed on the working surfaces of the dies is automatically controlled, the aim of forging lubrication is achieved, and forging defects are reduced.

According to the die lubricant rotating spray tray device, the rotating speeds and rotating times of the servo motors are controlled by a PLC control unit, and the pipeline valve bodies are controlled by the PLC control unit, so that the flow rates, flow velocities and pressures of the compressed air and the lubricant are controlled, the dosages of the compressed air and the lubricant are controlled and regulated, and the dosage of the lubricant sprayed on the working surfaces of the dies is automatically controlled. The pipeline valve bodies of the compressed air valve body control pipeline and the lubricant valve body control pipeline and the servo motors in the upper rotation driving mechanism and the lower rotation driving mechanism are connected with the PLC control unit in a signal manner, and the PLC control unit realizes control on the flow rates, flow velocities and pressures of the compressed air and the lubricant by controlling the pipeline valve bodies and realizes control on the rotating speed and the rotating time by controlling the servo motors, so that the amount of the lubricant sprayed towards the surfaces of the dies is controlled.

Embodiment 2

Different from the embodiment 1, the embodiment 2 is characterized in that the amounts of the pitch circle closed mold cavities in the upper nozzle 2 and the lower nozzle 3 are different. In the embodiment 2, the upper nozzle 2 is a circular empty tube with a top surface and forms a cavity, and through holes in communication with the outside are formed in the corresponding top surface of the cavity; the lower nozzle 3 is a circular empty tube with a bottom surface and forms a cavity, and through holes in communication with the outside are formed in the corresponding bottom surface of the cavity. In the embodiment 2, a pitch circle closed mold cavity is formed in the upper part of the spray tray main frame 18, a pitch circle closed mold cavity is formed in the lower part of the spray tray main frame 18, the upper air pipe joint, the upper lubricant pipe joint, the upper nozzle connecting pipe, the upper connecting sleeve body and the upper nozzle at the upper part form an independently-communicated cavity pipeline, and the lower air pipe joint, the lower lubricant pipe joint, the lower nozzle connecting pipe, the lower connecting sleeve body and the lower nozzle at the lower part form the other independently-communicated cavity pipeline. The rest parts and a connection relationship thereof are same as those in the embodiment 1, the descriptions thereof are omitted herein. The amount of the cavities formed in the upper nozzle and the lower nozzle may be regulated as required in the embodiment.

It is clear that the present disclosure provides the die lubricant rotating spray tray device, the nozzles, the connecting sleeve bodies, the nozzle connecting pipes, the air pipe joints and the lubricant pipe joints are sequentially connected to form independently-communicated cavity pipelines, the compressed air is input from the air pipe joints, the lubricant is input from the lubricant pipe joints, the rotation driving mechanisms drive the spray tray rotators to rotate through the transmission mechanisms, and the spray tray rotators drive the nozzles to rotate, so that the same dosage of lubricant is sprayed on the maximum pitch circle surfaces of the upper and lower dies, the aim of uniformly spraying the forging lubricant on the working surfaces of the upper and lower dies is achieved, and forging defects are reduced; and meanwhile, the automatic spraying of the lubricant on the maximum pitch circle surfaces of the upper and lower dies may be realized, the automation degree of equipment may be increased, and the production efficiency may be increased.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application

The invention claimed is:

1. A die lubricant rotating spray tray device, comprising an upper spray tray rotator, a lower spray tray rotator, an upper nozzle, a lower nozzle, a spray tray main frame, an upper transmission mechanism, a lower transmission mechanism, an upper rotation driving mechanism, a lower rotation driving mechanism, upper connecting sleeve bodies, lower connecting sleeve bodies, upper nozzle connecting pipes, upper air pipe joints, upper lubricant pipe joints, lower nozzle connecting pipes, lower air pipe joints and lower lubricant pipe joints, wherein the spray tray main frame is divided into an upper part and a lower part which are symmetrical, the upper part of the spray tray main frame is provided with the upper spray tray rotator, the upper nozzle, the upper transmission mechanism, the upper rotation driving mechanism, the upper connecting sleeve bodies, the upper nozzle connecting pipes, the upper air pipe joints and the upper lubricant pipe joints; the upper nozzle is a circular empty tube with a top surface and forms a cavity, through holes in communication with the outside are formed in the corresponding top surface of the cavity, or the upper nozzle is a plurality of mutually-nested circular empty tubes with a top surface and forms a plurality of cavities, and through holes in communication with the outside are formed in the corresponding top surface of each cavity; the upper spray tray rotator is a circular empty tube, the outer side of the upper nozzle is fixedly connected with the inner wall of the upper spray tray rotator, and the upper nozzle is capable of rotating with the upper spray tray rotator; the lower end of the upper nozzle is connected with one or more upper connecting sleeve bodies fixedly arranged at the upper part of the spray tray main frame, one end of each upper connecting sleeve body is connected with the lower end of the upper nozzle, and the other end of the upper connecting sleeve body is connected with the upper nozzle connecting pipe; one end of each upper nozzle connecting pipe is connected with the upper connecting sleeve body, the other end of the upper nozzle connecting pipe is connected with the upper air pipe joint and the upper lubricant pipe joint, compressed air is input from the upper air pipe joints, and a lubricant is input from the upper lubricant pipe joints; one cavity of the upper nozzle is correspondingly connected with one upper connecting sleeve body, one upper connecting sleeve body is correspondingly connected with one upper nozzle connecting pipe, one upper nozzle connecting pipe is correspondingly connected with one upper air pipe joint and one upper lubricant pipe joint to form an independently-communicated cavity pipeline; the upper transmission mechanism is connected with a rotating shaft of the upper rotation driving mechanism and the upper spray tray rotator, the upper rotation driving mechanism drives the upper spray tray rotator to rotate by virtue of the upper transmission mechanism, and the upper spray tray rotator and the upper nozzle rotate relative to the upper connecting sleeve bodies; and the lower part of the spray tray main frame is provided with the lower spray tray rotator, the lower nozzle, the lower transmission mechanism, the lower rotation driving mechanism, the lower connecting sleeve bodies, the lower nozzle connecting pipes, the lower air pipe joints and the lower lubricant pipe joints; the lower nozzle is a circular empty tube with a bottom surface to form a cavity, through holes in communication with the outside are formed in the corresponding bottom surface of the cavity, or the lower nozzle is a plurality of mutually-nested circular empty tubes with a bottom surface and forms a plurality of cavities, and through holes in communication with the outside are formed in the corresponding bottom surface of each cavity; the lower spray tray rotator is a circular empty tube, the outer side of the lower nozzle is fixedly connected with the inner wall of the lower spray tray rotator, and the lower nozzle is capable of rotating with the lower spray tray rotator; the upper end of the lower nozzle is connected with one or more upper connecting sleeve bodies fixedly arranged at the lower part of the spray tray main frame, one end of each lower connecting sleeve body is connected with the upper end of the lower nozzle, and the other end of the lower connecting sleeve body is connected with the lower nozzle connecting pipe; one end of each lower nozzle connecting pipe is connected with the lower connecting sleeve body, the other end of the lower nozzle connecting pipe is connected with the lower air pipe joint and the lower lubricant pipe joint, compressed air is input from the lower air pipe joints, and a lubricant is input from the lower lubricant pipe joints; one cavity of the lower nozzle is correspondingly connected with one lower connecting sleeve body, one lower connecting sleeve body is correspondingly connected with one lower nozzle connecting pipe, one lower nozzle connecting pipe is correspondingly connected with one lower air pipe joint and one lower lubricant pipe joint to form an independently-communicated cavity pipeline; the lower transmission mechanism is connected with a rotating shaft of the lower rotation driving mechanism and the lower spray tray rotator, the lower rotation driving mechanism drives the lower spray tray rotator to rotate by virtue of the lower transmission mechanism, and the lower spray tray rotator and the lower nozzle rotate relative to the lower connecting sleeve bodies.

2. The die lubricant rotating spray tray device of claim 1, wherein each of the upper rotation driving mechanism and the lower rotation driving mechanism comprises a servo motor, a protruded flange, a coupling, a rotating shaft, a small flange and rotating bearings, the servo motor is arranged on the protruded flange and is fixedly arranged in the spray tray main frame by the protruded flange, an output shaft of the servo motor is connected with the coupling after penetrating through the protruded flange, and the coupling is connected with the output shaft of the servo motor and the rotating shaft; one end of the rotating shaft is connected with the coupling, and the other end of the rotating shaft is fixedly arranged on the surface of the spray tray main frame by the small flange; and the upper and lower ends of the rotating shaft are sleeved with the rotating bearings fixedly arranged in the spray tray main frame.

3. The die lubricant rotating spray tray device of claim 1, wherein each of the upper transmission mechanism and the lower transmission mechanism comprises a pinion and a large gear, the large gears are fixedly arranged at the outer sides of the upper spray tray rotator and the lower spray tray rotator, and the pinions are fixedly arranged on the rotating shafts of the upper rotation driving mechanism and the lower rotation driving mechanism; and the pinions and the large gears are occluded to rotate.

4. The die lubricant rotating spray tray device of claim 1, wherein the inside of the lower end of the circular empty tube of the upper nozzle is provided with a circular ring which is inwards protruded; the outer side of the upper end of the upper connecting sleeve body is provided with a circular ring which is outwards protruded; the circular ring of the circular empty tube of the upper nozzle is connected with the circular ring of the upper connecting sleeve body and is capable of rotating on the circular ring of the upper connecting sleeve body; the inside of the upper end of the circular empty tube of the lower nozzle is provided with a circular ring which is inwards protruded; the outer side of the lower end of the lower connecting sleeve body is provided with a circular ring which is outwards protruded; and the circular ring of the circular empty tube of the lower nozzle is connected with the circular ring of the lower connecting sleeve body and is capable of rotating on the circular ring of the lower connecting sleeve body.

5. The die lubricant rotating spray tray device of claim 4, wherein a sealing ring is arranged between the circular ring of the circular empty tube of the upper nozzle and the circular ring of the upper connecting sleeve body; and a sealing ring is arranged between the circular ring of the circular empty tube of the lower nozzle and the circular ring of the lower connecting sleeve body.

6. The die lubricant rotating spray tray device of claim 1, wherein each of the upper end of the upper spray tray rotator and the lower end of the lower spray tray rotator is provided with a flange fixedly arranged on the spray tray main frame; the upper end of the lower spray tray rotator is further provided with two semicircular flanges which are fixedly connected to the spray tray main frame.

7. The die lubricant rotating spray tray device of claim 1, wherein the outer side of each of the upper and lower ends of the upper spray tray rotator and the lower spray tray rotator is provided with a bearing fixedly arranged on the spray tray main frame.

8. The die lubricant rotating spray tray device of claim 7, wherein baffle rings are arranged between the upper transmission mechanism at the outer side of the upper spray tray rotator and the bearings at the outer sides of the upper and lower ends of the upper spray tray rotator and sleeve the outer side of the upper spray tray rotator; and baffle rings are further arranged between the lower transmission mechanism at the outer side of the lower spray tray rotator and the bearings at the outer sides of the upper and lower ends of the lower spray tray rotator and sleeve the outer side of the lower spray tray rotator.

9. The die lubricant rotating spray tray device of claim 1, wherein each of the top surface of the upper nozzle and the bottom surface of the lower nozzle is provided with a nozzle end cover, holes corresponding to the through holes in the upper nozzle or the lower nozzle are formed in each nozzle end cover, and the holes in the nozzle end covers are horn-shaped.

10. The die lubricant rotating spray tray device of claim 1, wherein the upper air pipe joints and the lower air pipe joints are connected to a compressed air valve body control pipeline, and the upper lubricant pipe joints and the lower lubricant pipe joints are connected to a lubricant valve body control pipeline; the device is further provided with a control unit which is respectively connected with a pipeline valve body of the compressed air valve body control pipeline and a pipeline valve body of the lubricant valve body control pipeline and the servo motors in the upper rotation driving mechanism and the lower rotation driving mechanism in a signal manner; and the control unit realizes control on the flow rates, flow velocities and pressures of the compressed air and the lubricant by controlling the pipeline valve bodies and realizes control on the rotating speed and the rotating time by controlling the servo motors, so that the amount of the lubricant sprayed towards the surfaces of the dies is controlled.

* * * * *